Oct. 16, 1928.                                                    1,688,201
N. J. NEALL ET AL
ELECTRIC STEAM BOILER AND METHOD OF OPERATING THE SAME
Filed Nov. 5, 1924        2 Sheets-Sheet 1
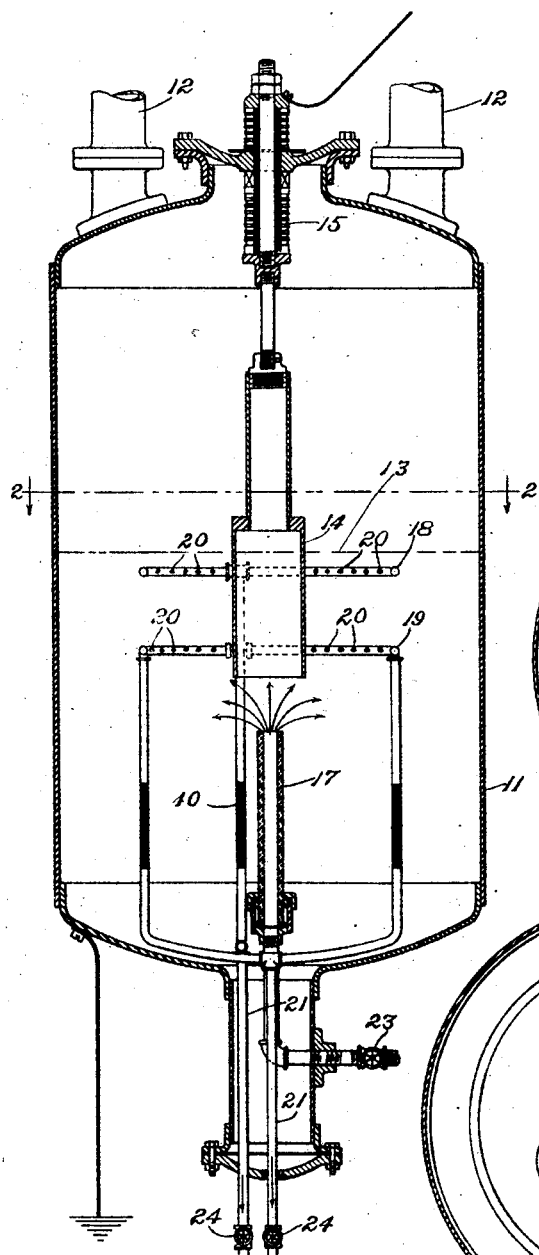
Fig_1_
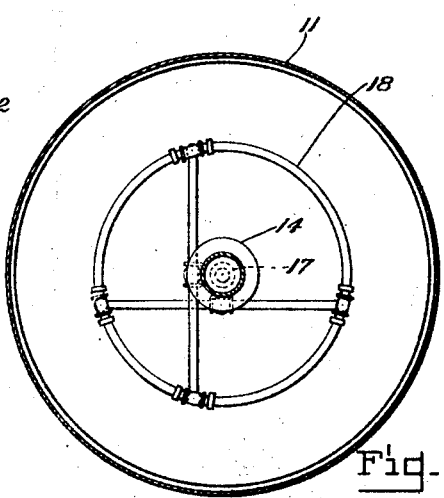
Fig_2_
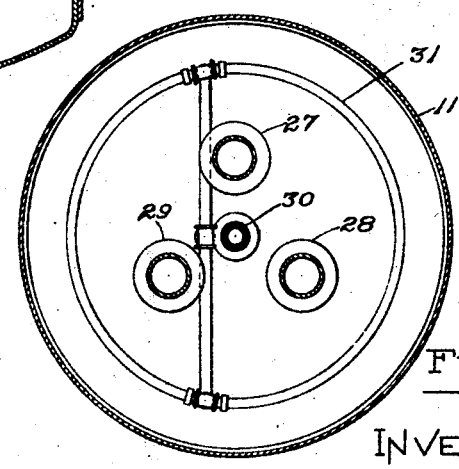
Fig_4_
INVENTORS:
Newitt J. Neall, Ralph W. Chadbourn
by Macleod, Calver, Copeland & Dike
ATTORNEYS.

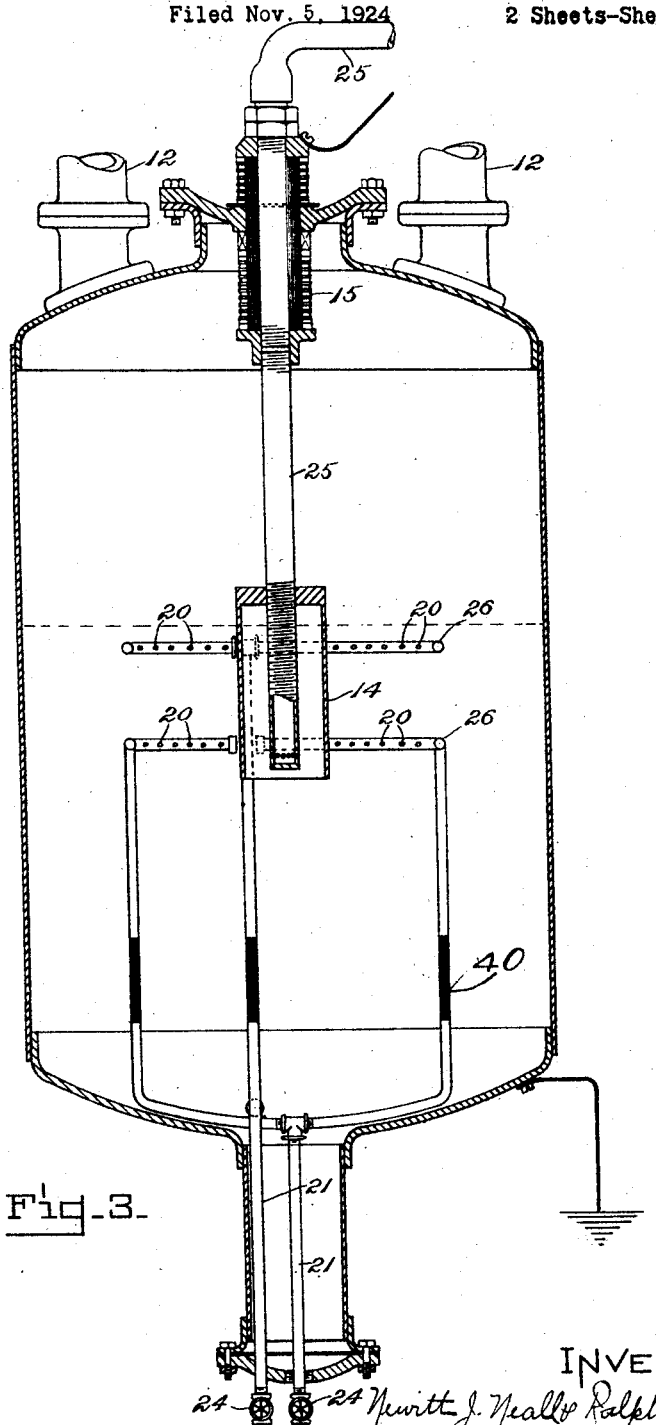

Patented Oct. 16, 1928.

1,688,201

UNITED STATES PATENT OFFICE.

NEWITT J. NEALL, OF BROOKLINE, AND RALPH W. CHADBOURN, OF MELROSE, MASSA-CHUSETTS, ASSIGNORS TO OXFORD PAPER COMPANY, OF NEW YORK, N. Y., A CORPORATION OF NEW YORK.

ELECTRIC STEAM BOILER AND METHOD OF OPERATING THE SAME.

Application filed November 5, 1924. Serial No. 747,970.

Our invention relates to improvements in electric steam boilers and methods of operating the same with a view of making possible the practical use of electric boilers under varying load and varying water conditions and also to improve the efficiency and practical utility of electric steam boilers under more or less constant conditions of load and water.

Heretofore, electric steam boilers of the type in which water is converted into steam by the passage of alternating current through the water, have been operated to some extent but have not come into wide general use, in part on account of limited applicability and in part on account of limitations and difficulties of operation which will be explained hereinafter.

Electric boilers, and particularly relatively large units, are especially useful as a means for converting surplus and consequently varying quantities of electric power into steam, but electric boilers, as heretofore constructed, have been reasonably satisfactory only when operated under practically constant load conditions, and upon uniform and relatively pure feed water.

In the operation of electric steam boilers as heretofore constructed and operated, there frequently develops—immediately, under some conditions, and within a few hours under other conditions—electric disturbances which finally become so accentuated as to render the running of the boiler for a longer time impractical.

We have found, that, in the operation of electric boilers there is produced, by the passage of the electric current, a substance having some of the characteristics of a colloid and which for convenience we have referred to herein as a colloid-like substance. We do not know the exact nature of this substance, but believe it to be akin to an oxide or oxides of iron or of the substance of which the electrodes and possibly the shell of the boiler are composed. That as water is converted into steam, this residue and any residue due to the presence of salts or other mineral ingredients in the feed water remain, forming what may be termed a "concentrate" which, as the operation of the boiler continues, increases in degree unless controlled; that this concentrate does not differ substantially in specific gravity from water and therefore while distributed to some extent through all the boiler water it tends to remain at the upper part of the boiler water and to form a layer or stratum due to the stratifying action of water of different temperatures; that the electric resistance of the water diminishes and consequently the amount of current which will pass through under given conditions will increase as the concentration of this residue increases; and finally that when the concentration passes beyond a given point for the particular type of electric current employed, disassociation of gases and arcing in the solution, begins and increases as the concentration of the solution increases.

The formation of the colloid-like substance is not to be confused with the presence of salts or other scale-forming substances which has heretofore been thought by some to be the chief cause of the difficulties with electric boilers, since as far as we have been able to learn, the existence of the colloid-like solution and its effects have never before been recognized. After having been once formed, this substance remains in the boiler and does not pass off with the steam nor do the ordinary methods of feeding and bleeding the boiler prevent its formation nor remove it from the boiler to an extent sufficient to prevent interference with its operation. For instance, in a boiler which was run until the arcing became so serious as to prevent further operation and which during the runing had been bled continuously, it was found that the bleed water did not indicate the presence of the colloid-like substance, but when, after the boiler was stopped and it was blown down, it was found that the last of the contents removed was a dark colored concentrate which produced a permanent dense foam.

Our experiments lead us to believe that the production of arcing and the accompanying disassociation of gases is an effect of concentration of electrical energy depending upon the relationship of voltage, current flow and electrical resistance of the solution within the region of active steam production, and that it is immaterial which of these is varied with respect to the ultimate appearance of the difficulties noted, but inasmuch as in practical conditions the voltage is constant but the current is varied by the power available, it is necessary to control the resistance conditions accordingly.

We are aware that electric boilers have been constructed with two chambers and means for producing violent circulation of water between the two chambers in the hope of maintaining more satisfactory conditions, but such an arrangement is only partly corrective of the troubles because even here the resistance of the water between the electrodes is always reduced to a certain extent even under the best possible conditions, and this reduction is merely somewhat palliated by the entrance of fresh water.

We are also aware that fresh water has been introduced under the electrodes, and that arrangements have been made to bleed the boiler continuously but in these boilers the flow of the entering water and of the concentrate have not been separated from each other with the result that only a partial improvement in results has been achieved.

Furthermore, it has been believed that violent agitation of the solution so that the electrodes will be washed vigorously will prevent the formation of a steam envelope about the electrodes and that arcing, the existence of which has been well recognized, will thus be prevented, but our experiments indicate that this theory is not correct and its fallacy will be apparent when it is considered that the formation of the concentrate which is the concomitant of steam generation is so rapid that no ordinary speed of the water will substantially offset it.

It has also been previously suggested that arcing is due to too great current density, i. e. amperes per square inch of electrode surface immersed, but our experiments show that this is only one factor and that arcing is primarily an energy effect dependent, as already explained, on a combination of the three factors, voltage, current, and resistivity of the solution.

Our invention is therefore primarily dependent on the ascertainment of the fact that there exists a colloid-like substance most of which ordinarily remains in the upper stratum in the boiler.

Accordingly, we overcome the several difficulties mentioned, which have heretofore been but slightly mitigated, by introducing the feed water at the region where the steam is being formed and simultaneously removing directly from the region of active steam formation the concentrate which is produced so that the electric current will always be acting with greatest intensity on fresh water and water of maximum resistivity is presented preferably as near as possible in the path of the maximum voltage gradient. This introduction of fresh water at the point of maximum voltage gradient and the removal of the concentrate from the region of active steam formation is done at such rates as will maintain the resistivity of the concentrate in the main area of steam production above the predetermined point at which arcing will occur for the particular feed water and electric current which is employed, due consideration being given to any variation in the immersion of the electrodes. We regulate the introduction of fresh water and the removal of the concentrate in accordance with the variations of the input of electric current into the boiler and thereby are able to operate the boiler successfully under varying load conditions. It will be understood of course that variation in the immersion of the electrodes is a factor in the total resistance to the passage of the electric current through the water, the resistivity of the water being the other factor.

Practical experience has demonstrated that by these novel methods of operation, arcing can be completely eliminated and the boilers will operate quietly.

We also find that our system of operation makes it possible to operate electric boilers with feed waters of a character which has heretofore been thought to render the use of electric boilers entirely out of the question. The employment of the novel method embodying our invention makes possible a more efficient and satisfactory operation of electric boilers with feed waters which have heretofore been thought to be entirely satisfactory.

While the hereindescribed novel methods of operation are most effective when employed in boilers having a single central electrode, the shell forming the other electrode, they are effective in connection with other types of electric steam boilers and do away altogether with the necessity for two chambers in the boiler and with mechanical circulation systems.

The invention will be fully understood from the following description when taken in connection with the accompanying drawings and the novel features thereof will be pointed out and clearly defined in the claims at the close of this specification.

In the drawings:

Fig. 1 is a sectional view of a boiler embodying our invention and by which our novel method of operation may be employed.

Fig. 2 is a section on line 2—2, Fig. 1, looking in the direction of the arrows.

Figs. 3 and 4 show our inventions as applied to other types of boilers.

Referring to the drawings:

At 11 is shown the shell, at 12 the steam-main by which the steam is taken off and at 13 is indicated the water level. This boiler is intended to be operated by a three phase alternating current and will be understood to be one unit of a group of three, the electrodes of which are connected in the ordinary manner. The live electrode is shown at 14 and is insulated from the shell as shown at 15, while the shell is grounded, and forms the other electrode of the unit. The live electrode 14 may be of any desired shape but is here shown as cylindrical, although electrodes of other shapes may be employed, as is described in an application for U. S. Letters Patent filed by ourselves. Serial No. 747,970. The live electrode 14 is partly immersed in water, the amount of the immersion being a variable factor of which advantage may be taken to control in part the operation of the boiler. As will be readily understood the current passes between the immersed surface of the electrode and the walls of the boiler and the resistance of the water to its passage produces heat and boils the water. The region of maximum voltage gradient is at the surface of the electrode and diminishes as the wall of the boiler is approached. The region of most active steam production is adjacent the electrode. As already explained the passage of the electric current through the water produces the concentrate already described which tends to remain in the region of maximum electric activity, and as the operation of the boiler continues the concentration of the solution about the electrode or electrodes increases, and diminishes the resistance which is offered to the passage of the electric current. If this is allowed to continue the resistivity of the water will be diminished to the point where arcing and consequent disassociation of gases will begin. If, during the operation of the boiler, the water is bled from the bottom of the boiler in the ordinary way, no substantial effect on the concentration of the steam bearing region will be produced.

Accordingly and in order that the electric current may always be acting on water of maximum resistivity for the water employed, we introduce the fresh water near the region of maximum steam production and remove the concentrate immediately on its formation to whatever extent the operating conditions require. In the form of boiler shown in the drawings, a feed water pipe 17 made of insulating material to prevent short circuiting introduces fresh water just below the center electrode 14 so that it spreads or mushrooms out into the locality of maximum steam production adjacent the lower rim of the electrode 14 as shown by the arrows. This arrangement takes advantage of the voltage gradient between the center electrode and the shell of the boiler, introducing the fresh feed water as near as possible at the maximum point and allowing it to flow horizontally and radially toward the shell of the boiler as it is acted upon by the electric current which is passing between the central electrode and the shell of the boiler. At 18 and 19 are shown two rings of pipe having orifices 20 and connected to pipes 21. The pipes 18 and 19 are located near the live electrode 14 and are insulated as shown at 40 to prevent short circuiting and serve to draw off the concentrate as it is formed. The rings may be operated singly or in multiples as required, this being in part dependent on the location vertically of the steam-forming zone the portion of which varies with the load. It will be seen that the pipes 18 and 19 are adjacent the region of maximum steam production. At 23 and 24 are shown valves by which the inflow of fresh water and the outflow of concentrate are regulated.

By the mechanism shown, the concentrate is removed directly on its formation and without forming any cross currents in the boiler which result in dilution of the concentrate and consequent loss of water and without contaminating the fresh water and lowering its resistivity.

In Fig. 3 we have shown another form of boiler embodying our invention. In this boiler the feed water is introduced by the feed pipe 25 through the central electrode 14, and is removed by a ring 26. The feed pipe is insulated as shown at 40. The ring 26 is located so near the shell that insulation is not necessary. In Fig. 4 we have shown our invention as applied to a boiler having three central electrodes 27, 28 and 29 to be operated in the well-known manner by 3 phase current. In this boiler, the feed water enters at 30 and the concentrate is removed by a single ring 31.

In designing an electric boiler embodying our invention and for practicing the herein described methods, it will be understood that the exact method of circulation of the incoming feed water and outflowing concentrate is not necessarily invariable, since we have found that excellent results, much better than heretofore have been achieved by boilers of ordinary construction can be obtained by reversing the circulation and removing the concentrate from a point adjacent the live electrode or electrodes and introducing the feed water near the shell of the boiler. This is undoubtedly due to the fact that the stratification which takes place in the boiler tends to keep the concentrate in a stratum on the top of the boiler water and this concentrate, unless removed, spreads out and occupies the entire top level so that it can be removed from any point in this level and fresh water introduced at any convenient point. For maximum efficiency of the boiler, however, it is desirable to have the current travel through a layer of water which is practically uncontaminated by the concentrate and accordingly the best results have been obtained by introducing the feed water closely adjacent the live electrode and removing the concentrate from the region where the concentration is greatest.

What we claim is:
1. In an electric boiler, the combination of an electrode about which is a region of active steam formation, a pipe supplying feed water to said region, and a ring of pipe provided with a plurality of orifices, said ring being insulated from the electrode to prevent short circuiting and serving to remove the concentrate from the region of active steam formation.

2. In an electric boiler, an electrode about which there is a region of active steam formation, an inlet orifice adjacent said electrode for introducing fresh water near the region of active steam formation without allowing it to mingle with the contents of the remainder of the boiler, and a discharge orifice for withdrawing the produced concentrate on its formation from said region while excluding it from mixing with the incoming fresh water.

3. The method of operating an electric boiler having an electrode about which is a region of active steam formation, which consists in introducing fresh water near the region of active steam formation without allowing it to mingle with any other fluid, and removing the produced concentrate immediately and continuously upon its formation from the region of active steam formation while excluding it from mixing with the incoming fresh water.

In testimony whereof we affix our signatures.

NEWITT J. NEALL.
RALPH W. CHADBOURN.